US006940339B2

(12) United States Patent
Otaka

(10) Patent No.: US 6,940,339 B2
(45) Date of Patent: Sep. 6, 2005

(54) MOBILITY PROPORTION CURRENT GENERATOR, AND BIAS GENERATOR AND AMPLIFIER USING THE SAME

(75) Inventor: Shoji Otaka, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 11/003,734

(22) Filed: Dec. 6, 2004

(65) Prior Publication Data

US 2005/0095991 A1 May 5, 2005

Related U.S. Application Data

(62) Division of application No. 10/283,199, filed on Oct. 30, 2002, now Pat. No. 6,885,239.

(30) Foreign Application Priority Data

Oct. 31, 2001 (JP) .................................... 2001-335839

(51) Int. Cl.[7] .............................. G05F 3/00; H04B 1/16

(52) U.S. Cl. ........................ 327/543; 327/361; 327/538; 455/73; 455/343.1

(58) Field of Search ................................ 327/335, 361, 327/538, 543; 323/312, 315; 455/73, 76, 108, 111, 112, 113, 127.1, 323, 343.1

(56) References Cited

U.S. PATENT DOCUMENTS

| | | | | |
|---|---|---|---|---|
| 4,454,467 A | | 6/1984 | Sakaguchi | 323/315 |
| 4,647,840 A | | 3/1987 | Hiyama | 323/315 |
| 5,109,187 A | | 4/1992 | Guliani | 323/315 |
| 5,519,313 A | | 5/1996 | Wong et al. | 323/315 |
| 5,955,874 A | | 9/1999 | Zhou et al. | 327/542 |
| 6,023,157 A | | 2/2000 | Kazuno | 323/316 |
| 6,313,692 B1 | | 11/2001 | Pease | 327/538 |
| 6,396,249 B1 | | 5/2002 | Itakura et al. | 323/373 |
| 6,404,293 B1 | * | 6/2002 | Darabi et al. | 331/37 |
| 6,417,737 B1 | * | 7/2002 | Moloudi et al. | 330/301 |
| 2003/0067359 A1 | * | 4/2003 | Darabi et sl. | 331/46 |
| 2004/0166803 A1 | * | 8/2004 | Moloudi et al. | 455/20 |

OTHER PUBLICATIONS

Takafumi, Yamaji, et al., "A Temperature–Stable CMOS Variable–Gain Amplifier with 80–dB Linearly Controlled Gain Range", IEEE Journal of Solid–State Circuits, vol. 37, No. 5, May 2002, pp. 553–558.

* cited by examiner

*Primary Examiner*—Terry D. Cunningham
(74) *Attorney, Agent, or Firm*—Oblon, Spivak, McClelland, Maier & Neustadt, P.C.

(57) ABSTRACT

A mobility proportion current generator comprises a voltage adder including a first MOS transistor, the voltage adder adding a voltage whose temperature dependency is small with respect to the mobility and a threshold voltage of the first MOS transistor to output a sum voltage, and a second MOS transistor including whose drain terminal is connected to a constant potential point, the sum voltage of the voltage adder being applied between the gate terminal and the source terminal of the second MOS transistor to output a current proportional to the mobility being output from the drain terminal thereof.

10 Claims, 5 Drawing Sheets

MOBILITY PROPORTION CURRENT GENERATOR, AND BIAS GENERATOR AND AMPLIFIER USING THE SAME

CROSS-REFERENCE TO RELATED APPLICATIONS

This application is a divisional of U.S. patent application Ser. No. 10/283,199, filed Oct. 30, 2002, now U.S. Pat. No. 6,885,239, which is based upon and claims the benefit of priority from the prior Japanese Patent Application No. 2001-335839, filed Oct. 31, 2001, the entire contents of each of which are incorporated herein by reference.

BACKGROUND OF THE INVENTION

1. Field of the Invention

The present invention relates to a mobility proportion current generator, a bias generator and an amplifier using CMOS technology.

2. Description of the Related Art

In recent years, miniaturization and cost reduction of mobile radio terminal equipment represented by cellular phones have been moving forward energetically.

It is effective for realizing miniaturization and cost reduction of the mobile radio terminal equipment to fabricate a radio transceiver circuit which performs a transmit and receive process in a RF band in a integrated circuit.

It is desirable to use, as elements comprising the integrated radio transceiver circuit, MOS transistors suitable for high integration in comparison with bipolar transistors. The radio transceiver circuit of the mobile radio terminal equipment uses many amplifiers.

In these amplifiers, the transconductance of transistors comprising the amplifier varies with temperature. For this reason, the transconductance of the whole amplifier has temperature dependencys. When the amplifier has the temperature dependencys, it is necessary for making the amplifier operate stably to perform adjustment outside of the amplifier for compensating for the temperature dependencys. This temperature compensation prevents cost reduction of the radio communication equipment such as mobile radio terminal equipment including amplifiers using MOS transistors.

As described above, a conventional amplifier using MOS transistors has problems that the transconductance has a temperature dependency.

It is an object of the present invention to provide a mobility proportion current generator which is suitable to compensate for the temperature dependency of an MOS transistor, a bias generator using the mobility proportion current generator, and an amplifier using the bias generator.

BRIEF SUMMARY OF THE INVENTION

According to an aspect of the invention, there is provided a mobility proportion current generator which generates a current proportional to mobility, comprising a voltage adder including a first MOS transistor, the voltage adder adding a voltage whose temperature dependency is small with respect to the mobility and a threshold voltage of the first MOS transistor to output a sum voltage; and a second MOS transistor including a source terminal, a gate terminal and a drain terminal, the sum voltage of the voltage adder being applied between the gate terminal and the source terminal of the second MOS transistor to output a current proportional to the mobility from the drain terminal of the second MOS transistor.

According to another aspect of the invention, there is provided a bias generator which generates a bias current to be supplied to a to-be-biased circuit, comprising a current generator which generates a mobility proportion current proportional to mobility; and a current inverter circuit which is supplied with the mobility proportion current and produces the bias current inversely proportional to the mobility.

According to another aspect of the invention, there is provided an amplifier circuit comprising an amplifier fabricated by a differential pair of transistors whose sources are connected to a common terminal and a current source connected between the common terminal and a ground, the current source being configured by the bias generator recited above.

DETAILED DESCRIPTION OF THE INVENTION

Figure 1:
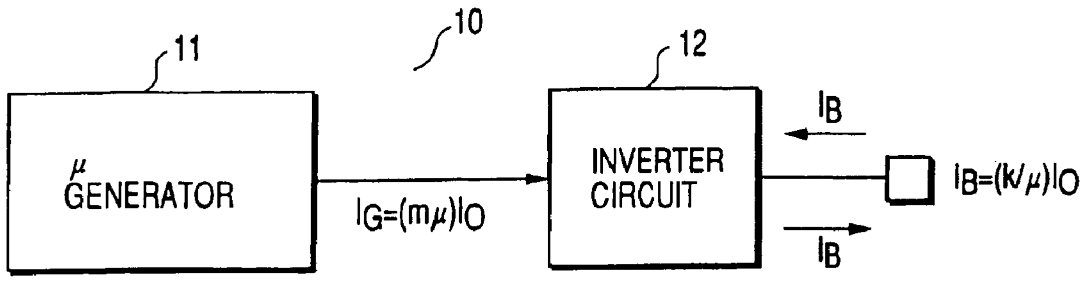
FIG. 1 shows a schematic block circuit of a bias generator related to an embodiment of the present invention.

There will now be described an embodiment of the present invention in conjunction with the drawings. FIG. 1 shows a schematic configuration of a bias generator related to the embodiment of the present invention.

A bias generator 10 comprises a mobility proportion current generator ($\mu$ GENERATOR) 11 and a current inverter circuit (INVERSE GENERATOR) 12. The principle of this bias generator 10 is as follows.

It can be understood from an equation (1) that the transconductance Gm of a MOS transistor does not depend upon temperature, if $\beta \times I_B$ is constant regardless of the temperature.

$$Gm = 2\sqrt{\beta I_B} \tag{1}$$

The mobility $\mu$ included in β (=0.5$\mu$CoxW/L) is determined by process, where Cox is the capacitance of an oxide film per a unit area. Generally, $\mu$ is expressed by the following equation (2), and has a temperature dependency.

$$\mu = \mu_0 (T/T_0)^{-n} \tag{2}$$

$\mu_0$ expresses mobility in temperature $T_0$, and n expresses temperature coefficient. n is determined by process condition, and generally has a value between 1.5 and 2. For this reason, even if the bias current $I_B$ is a current which does not depend upon temperature, the gain has a temperature dependency due to the temperature dependency of the mobility $\mu$. Thus, the present embodiment takes a method of making the temperature dependency of Gm small by setting the bias current $I_B$ so as to be inversely proportional to the mobility $\mu$.

In order to produce the bias current $I_B$ which is inversely proportional to the mobility $\mu$ based on this principle, the bias generator 10 is provided with a mobility proportion current generator 11 which generates a current $I_G=(m\mu)\ I_O$ proportional to the mobility $\mu$, where m is a constant having a unit of (V sec)/$m^2$, and $I_O$ is a current having no temperature dependency, or to be accurate, a current whose temperature dependency is small relative to that of mobility. Because a method for generating the current $I_O$ having no temperature dependency is described by, for example, U.S. patent application Ser. No. 09/985,595, "A temperature compensation circuit and a variable gain amplification circuit," the entire contents of which are incorporated herein by reference, its detailed description is omitted here.

The output current (current which is proportional to the mobility $\mu$) $I_G$ from the mobility proportion current generator 11 is input to a current inverter circuit 12. The bias current $I_B=(k/\mu)I_O$ which is inversely proportional to the mobility $\mu$ is generated by the current inverter circuit, where k is a constant having a unit of $m^2$/(V sec).

Figure 2:
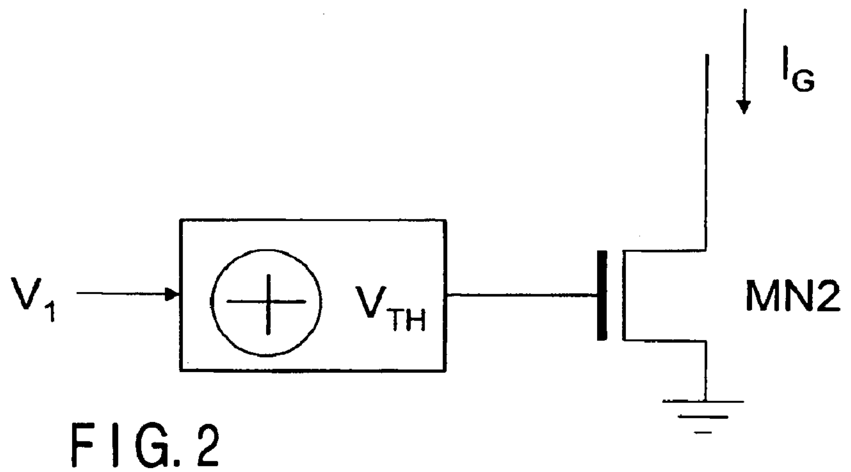
FIG. 2 shows a basic configuration of the mobility proportion current generator of FIG. 1.

FIG. 2 shows a basic configuration of the mobility proportion current generator 11. A voltage adder A adds a voltage $V_1$ having no temperature dependency, or to be accurate, a voltage whose temperature dependency is small with respect to that of mobility and a threshold voltage $V_{TH}$ of a first MOS transistor MN1.

The output voltage of the voltage adder A is applied to the gate of a common source transistor, i.e., a second MOS transistor MN2 whose source terminal is connected to a constant potential point (ground, for example). By such a configuration, the current $I_G$ proportional to the mobility $\mu$ is output from the drain terminal of the MOS transistor MN2.

Figure 3:
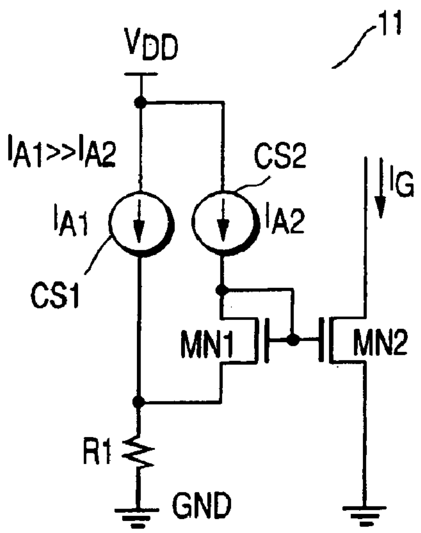
FIG. 3 shows a circuit of the mobility current generator shown in FIG. 2.

FIG. 3 shows a circuit diagram of the mobility proportion current generator 11 shown in FIG. 2. The voltage adder A shown in FIG. 2 comprises a first current source CS1, a first resistor $R_1$, a second current source CS2, and a first MOS transistor MN1. The first current source CS1 outputs a first current $I_{A1}$ having no temperature dependency, or to be accurate, a current whose temperature dependency is small relative to mobility. When the first current $I_{A1}$ flows through the first resistor $R_1$, a first voltage $V_1$ having no temperature dependency is produced between both terminals of the first resistor $R_1$. The second current source CS2 outputs a current $I_{A2}$ having no temperature dependency and smaller than the first current $I_{A1}$ Generally, a resistor has a temperature dependency, but it is small with respect to a temperature dependency of the intended mobility $\mu$. Therefore, the voltage $V_1$ has no temperature dependency.

In other words, one terminal of the first current source CS1 is connected to a power supply $V_{DD}$, and the other terminal is connected to one terminal of the first resistor $R_1$ and a source terminal of the first MOS transistor MN1. The other terminal of the resistor $R_1$ is connected to the ground GND. One terminal of the second current source CS2 is connected to the power supply $V_{DD}$, and the other terminal is connected to the drain and gate terminals of the transistor MN1 and the gate terminal of a second MOS transistor MN2. The source terminal of the transistor MN2 is connected to the ground GND, and a current IG proportional to the mobility is output from the drain terminal of the transistor MN2. The transistors MN1 and MN2 both are N-type MOS transistors.

In FIG. 3, the voltage $V_{GS}$ between the gate and source of the transistor MN1 is approximately:

$$V_{GS}=V_{TH}+\sqrt{I_{A2}/(0.5\mu CoxW/L)}-V_{TH}+\sqrt{(I_{A2/\beta})} \tag{3}$$

If the current $I_{A2}$ is decreased, the term of √ of the equation (3) can ignore in comparison with $V_{TH}$. More specifically, the current $I_{A2}$ is set so as to satisfy the following equation (4):

$$\sqrt{(I_{A2/\beta})}<V_{TH}/10 \tag{4}$$

More specifically, the second current source CS2 outputs the second current $I_{A2}$ satisfying $$\sqrt{I_{A2/(0.5\mu CoxW/L)}}<V_{TH}/10 \tag{5}$$

where the gate length of the first MOS transistor MN1 is L, the gate width is W, the mobility is $\mu$, the oxide film capacitance per a unit area is Cox, and a threshold voltage is $V_{TH}$.

A current $I_{A1}+I_{A2}$ flows through the resistor $R_1$. If $I_{A2}$ is set to satisfy condition of $I_{A2}<<I_{A1}$, the voltage $V_{R1}$ between the resistor $R_1$ is approximately:

$$V_1=V_{RT}-R_1\times I_{A1} \tag{6}$$

Therefore, the gate voltage (gate-to-ground voltage) $V_G$ of the transistor MN1 is approximately:

$$V_G=R_1\times I_{A1}+V_{TH} \tag{7}$$

Therefore, the current $I_G$ output from the drain terminal of the transistor MN2 is represented by the following equation (8):

$$T_G=\beta(V_G-V_{TH})^2-\beta(R_1\times T_{A1})^2 \tag{8}$$

IA1 is a current having no temperature dependency, so that $I_G$ has a temperature dependency based on the mobility $\mu$ included in β. In other words, $I_G$ can be represented by the following equation (9):

$$I_G=(m\mu)I_O \tag{9}$$

m is constant, and $I_O$ is a constant current independent of temperature.

Figure 4:
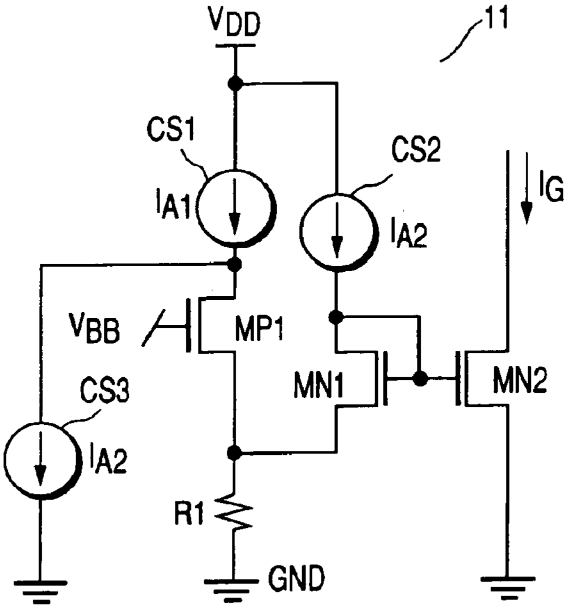
FIG. 4 shows another circuit of the mobility current generator shown in FIG. 2.

FIG. 4 shows another circuit of the mobility proportion current generator 11 shown in FIG. 2. The circuit of FIG. 4 differs from that of FIG. 3 as follows. The first current source CS1 is connected between the voltage source $V_{DD}$ and the source terminal of a PMOS transistor MP1 (third MOS transistor) newly added. The drain terminal of the transistor MP1 is connected to the resistor $R_1$. The gate terminal of the transistor MP1 is connected to a predetermined bias potential point $V_{BB}$. A third current source CS3 that outputs a current $I_{A2}$ equal to that of the second current source CS2 is connected between the source terminal of the transistor MP1 and the ground GND.

According to the circuit of FIG. 4, even if the condition of $I_{A1}>>I_{A2}$ is not established, the equation (6) is given, and the current IG which is output from the second MOS transistor MN2 is expressed by the equation (8).

Figure 5:
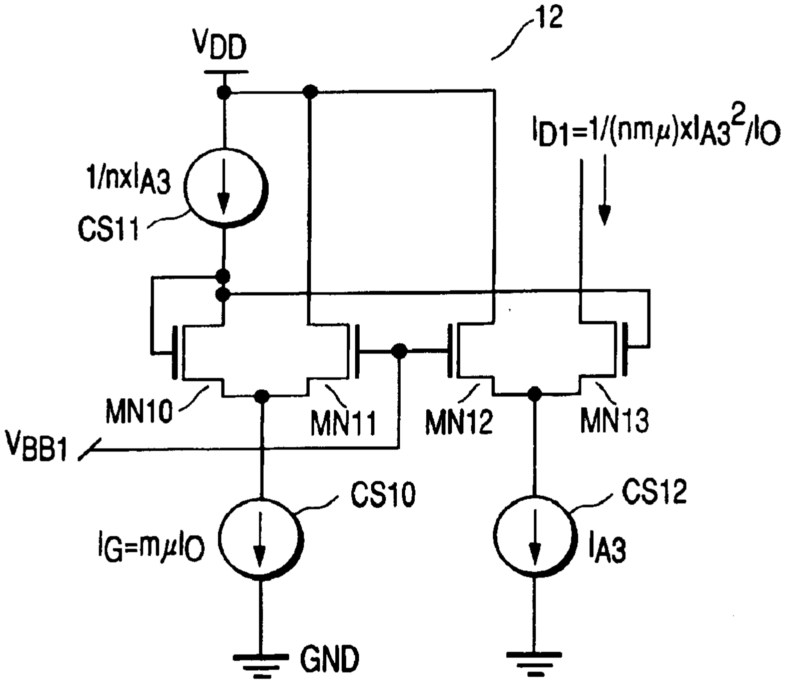
FIG. 5 shows a circuit of a current inverter circuit shown in FIG. 2.

FIG. 5 shows a circuit of the inverter circuit 12 shown in FIG. 1. This inverter circuit 12 comprises a first differential pair of fourth and fifth MOS transistors MN10 and MN11 and a second differential pair of sixth and seventh MOS transistors MN12 and MN13.

The output current $I_G$ of the mobility proportion current generator 11 is supplied as a tail current of the first differential pair, that is, a current flowing through the common source terminal of the transistors MN10 and MN11. FIG. 5 shows the transistor MN2 of FIG. 3 or 4 as a current source CS10. The gate and drain terminals of the transistor MN10 are connected to each other, and a predetermined current $I_{A3}$/n having no temperature dependency, or to be accurate, a current whose temperature dependency is small relative to mobility, is supplied to this node by the current source CS11. n and $I_{A3}$ are determined so that $I_{A3}$/n is always larger than $I_G$. As one example, $I_G$ and $I_{A3}$ are set to the same value in room temperature, and n is set to 2. The gate terminal of the transistor MN11 is connected to a power supply $V_{BB1}$.

The current $I_{A3}$ having no temperature dependency is supplied by the current source CS12 as a tail current of the second differential pair, i.e., a current flowing through the common terminal of the transistors MN12 and MN13. The gate terminal of the transistor MN12 is connected to the gate terminal of the transistor MN11, and the drain terminal of the transistor MN12 is connected to the power supply $V_{DD}$. The gate terminal of the transistor MN13 and the gate terminal of the transistor MN10 are connected to each other, and the drain current $I_{D1}$ of the transistor MN13 is output as the output current $I_B$ of the bias generator 10 or the current proportional thereto.

The MOS transistors MN10, MN11, MN12 and MN13 are fabricated so as to operate preferably in a weak inversion domain in order to obtain the inverse function. Since the MOS transistor operating in the weak inversion domain exhibits an exponential characteristic unlike the usual square characteristic in a current characteristic, each of the MOS transistors MN10, MN11, MN12 and MN13 behaves similarly to a bipolar transistor.

Therefore, according to current inverter circuit 12 shown in FIG. 5, a ratio between the tail current of the first differential pair of the transistor MN10 and MN11 and the drain current of the transistor MN10 is equal to a ratio between the tail current of the second differential pair of the transistors MN12 and MN13 and the drain current of the transistor MN13. As a result, the following equation (10) is made.

$$I_{A3}/n : I_G = I_{D1} : I_{A3} \tag{10}$$

where $I_G = (m\mu)I_O$. Therefore, $$I_{D1} = 1/(nm\mu)\cdot I_{A3}^2/I_O \tag{11}$$

$I_{D1}$ is inversely proportional to $\mu$, and $I_{A3}$, $I_O$, n, m are not dependent upon temperature, so that $I_{D1}$ is inversely proportional to the temperature dependency of $\mu$. For this reason, the temperature dependency of the transconductance Gm of the MOS transistor is small by using the current $I_{D1}$ as a bias current of the amplifier with MOS transistors.

Figure 6:
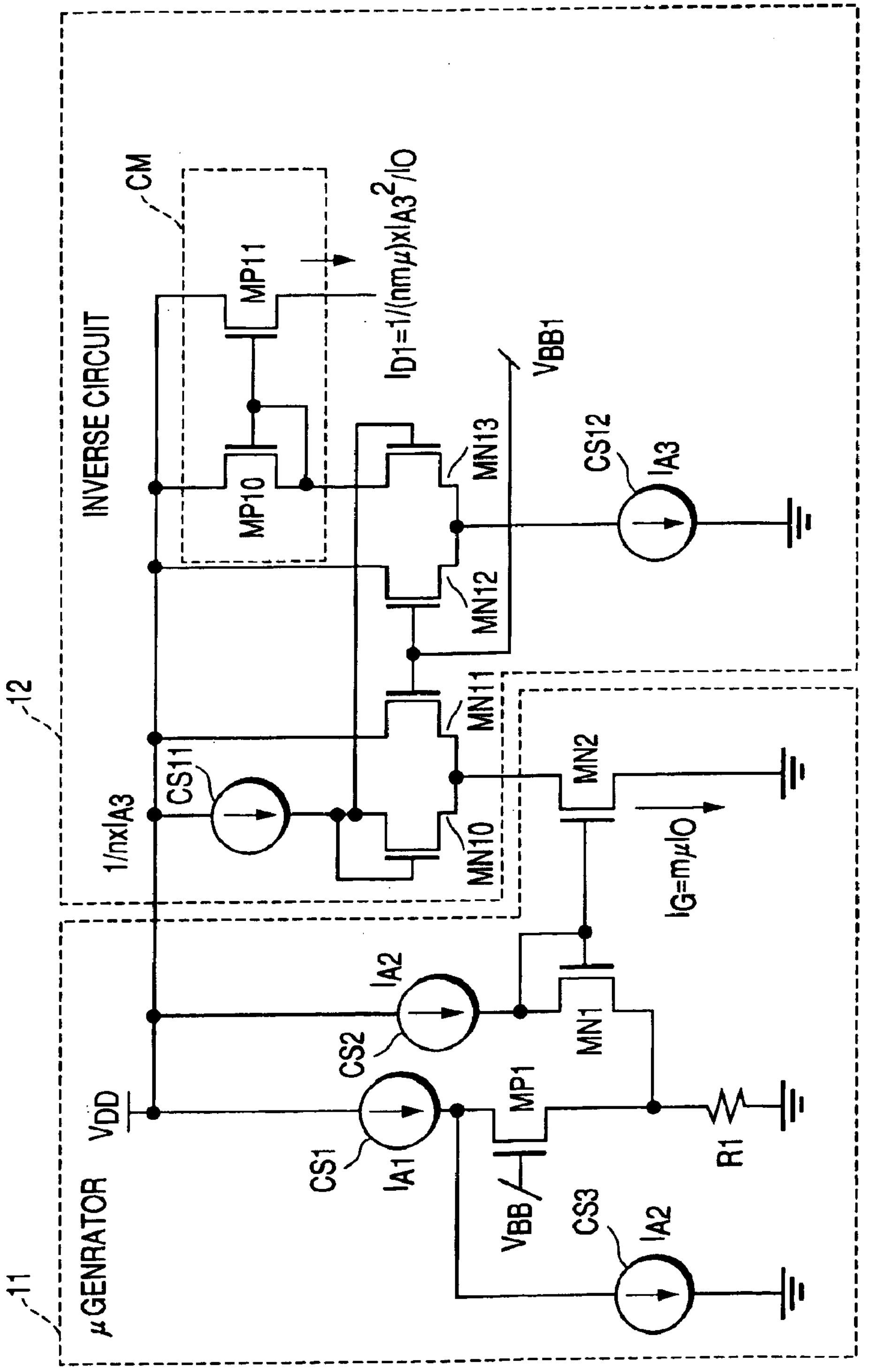
FIG. 6 shows a circuit of a bias generator related to the embodiment of the present invention.
Figure 7:
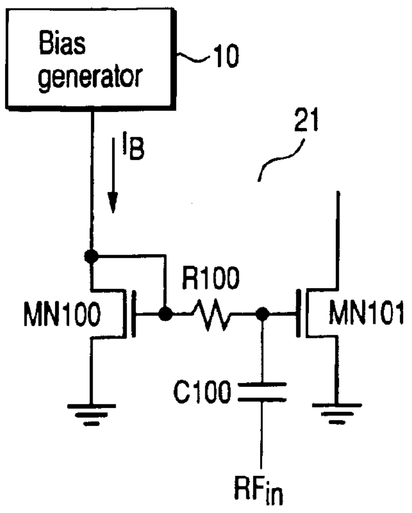
FIG. 7 shows a circuit of an amplifier using a bias generator related to the embodiment of the invention.
Figure 8:
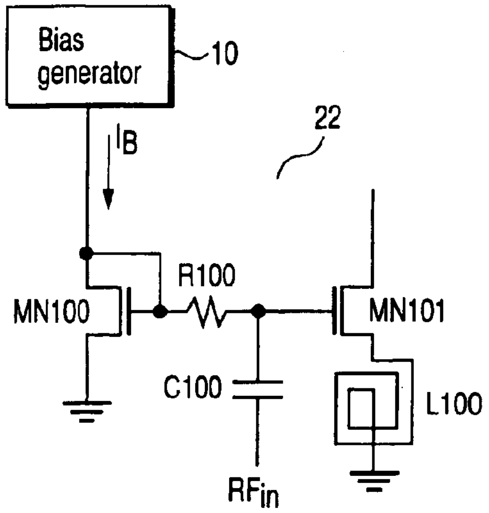
FIG. 8 shows a circuit of another amplifier using a bias generator related to the embodiment of the invention.

FIG. 6 shows a circuit of the bias generator 10 including the mobility proportion current generator 11 shown in FIG. 4 and the inverter circuit 12 shown in FIG. 5. The output current $I_{D1}$ of the inverter circuit 12, i.e., the output current $I_B$ of the bias generator 10 expresses a current obtained by folding the current of the transistor MN13 by a current mirror circuit fabricated by the P-type MOS transistors MP10 and MP11.

The bias generator 10 of the above embodiment is applied to amplifier circuits as shown in FIGS. 7 to 10. The amplifier circuit of FIG. 7 comprises an amplifier fabricated by MOS transistors MN100 and MN101 and a capacitor C100 and the bias generator 10. The amplifier 21 operates as a common source amplifier wherein the source of the transistor MN101 is grounded. The drain and gate terminals of the transistor MN100 whose source terminal is grounded are connected to the gate terminal of transistor MN101 via a resistor R100. The source terminal of the transistor MN101 is grounded and the drain terminal thereof is an output terminal.

A high frequency input signal RFin is input to the gate terminal of the transistor MN101 via the capacitor C100, amplified by the transistor MN101, and output as a current from the drain terminal of the transistor MN101. The bias current $I_B$ of the transistor MN101 is supplied by the bias circuit 10. An amplifier 22 shown in FIG. 8 includes an inductance L100 interposed between the source terminal of the transistor MN101 of the amplifier 21 of FIG. 7 and the ground. In this amplifier 22, the bias current $I_B$ is supplied by the bias circuit 10.

Figure 9:
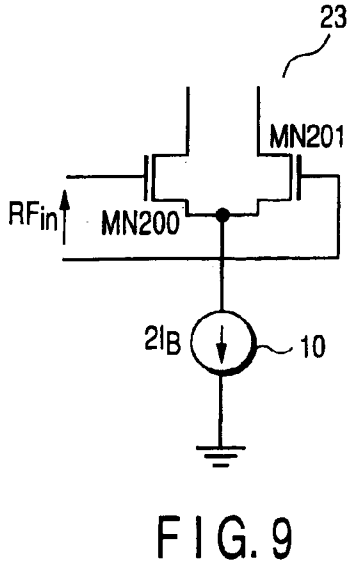
FIG. 9 shows a circuit of another amplifier using a bias generator related to the embodiment of the invention.

An amplifier 23 shown in FIG. 9 is a differential amplifier fabricated by a differential pair of transistors MN200 and MN201 whose sources are connected to a common terminal and a current source supplying a current 2$I_B$ as a tail current of the differential pair. In this amplifier 23, the current 2$I_B$ is supplied by the bias circuit 10. A high frequency input signal RFin is input between the gate terminals of the transistors MN200 and MN201. An output of the amplifier 23 is extracted from the drain terminals of the transistors MN200 and MN201.

Figure 10:
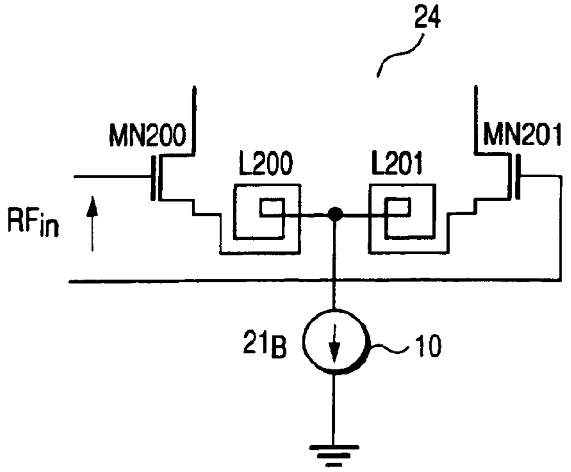
FIG. 10 shows a circuit of another amplifier using a bias generator related to the embodiment of the invention.

An amplifier 24 shown in FIG. 10 includes inductances L200 and L201 inserted in series between the source terminals of the transistors MN200 and MN201 of the amplifier 23 shown in FIG. 9, and a current source supplying a tail current 2$I_B$ to a connecting point of the inductances L200 and L201. In the amplifier 24, the tail current 2$I_B$ is supplied by the bias circuit 10. In other words, the output current $I_B$ of the bias generator 10 is used as the bias current of an amplifier circuit, for example, a drain bias current $I_B$ for the transistor MN100 in FIGS. 7 and 8 or the tail current 2$I_B$ Of the differential pair of the transistors MN200 and MN201 in FIGS. 9 and 10.

There will now described a radio transceiver circuit in mobile radio terminal equipment such as a portable telephone to which the bias generator 10 of the present embodiment is applied. The bias generator 10 of the present embodiment is applied to a radio transceiver circuit fabricated using a metal oxide semiconductor technique as a bias circuit required for the transceiver circuit.

Figure 11:
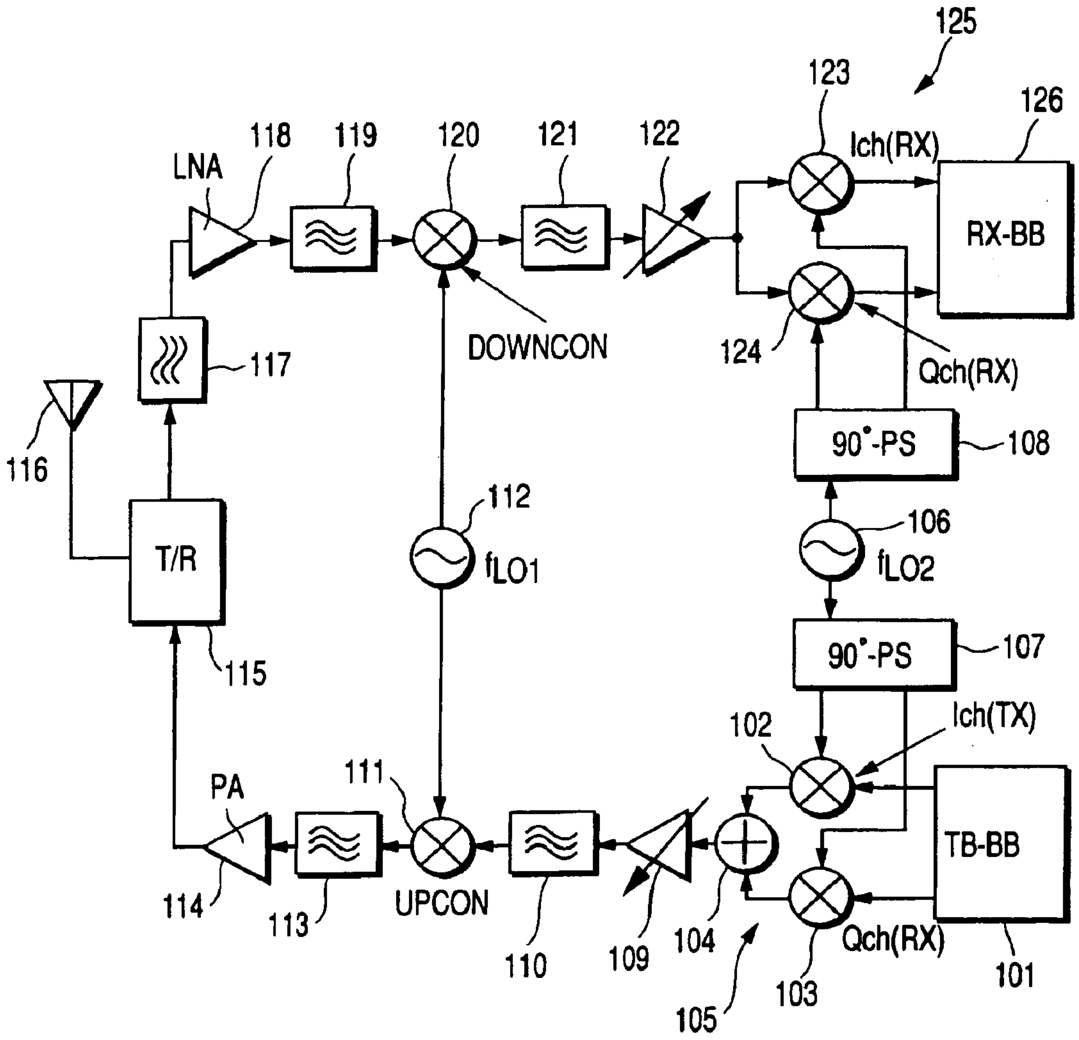
FIG. 11 shows a block circuit of a radio transceiver circuit of mobile wireless equipment applicable to the bias generator related to the embodiment of the present invention.

FIG. 11 shows a configuration of a radio transceiver unit of the mobile radio terminal equipment. There will now be described a transceiver unit of a TDD (Time Division Duplex) system for exchanging transmission and reception in time sharing as an example. However, the present invention is not limited to the transceiver unit.

At first the transmitter is described. In a baseband signal generator (TX-BB) 101, orthogonal first and the second transmission baseband signals I ch(TX) and Q ch(TX) are band-limited by a suitable filter. These orthogonal transmission baseband signals I ch(TX) and Q ch(TX) are input to an orthogonal modulator 105 comprising two multipliers 102 and 103 and an adder 104. The two orthogonal baseband signals modulate a second local signal $f_{LO2}$. The second local signal is generated by a local oscillator 106, divided in two signals by a 90° phase shifter (90°-PS) 107, and input to the orthogonal modulator 105.

A modulated signal output by the orthogonal modulator 105 is an IF (intermediate frequency) signal, and is input to a variable gain amplifier 109. The variable gain amplifier

109 regulates the input IF signal at a suitable signal level according to a gain control signal from a control system (not shown). The IF signal output from the variable gain amplifier 109 generally includes unnecessary harmonics components produced by the orthogonal modulator 105 and the variable gain amplifier 109. Therefore, the IF signal is input to an up converter 111 via a lowpass filter or bandpass filter 110 to remove the unnecessary components.

The up converter 111 performs frequency conversion (up conversion) by multiplying the IF signal with the first local signal of frequency $f_{LO1}$ which is generated by a first local oscillator 112, and generates an RF signal of frequency $f_{LO1}-f_{LO2}$ and a RF signal of frequency $f_{LO1}+f_{LO2}$. Either of the two RF signals is a desired wave output and the other an unnecessary image signal. In the above description, the RF signal of the frequency $f_{LO1}+f_{LO2}$ is assumed to be a desired wave, but the RF signal of the frequency $f_{LO1}-f_{LO2}$ may be the desired wave output. The image signal is removed by a image removal filter 113.

The desired wave output which is extracted by the up converter 111 via the image removal filter 113 is amplified to a necessary power level by a power amplifier (PA) 114, and then is supplied to a radio antenna 116 via a transmission/reception exchange switch (T/R) 115 to be emitted as a radio signal from the antenna.

In the receiver, the reception RF signal output from the radio antenna 116 is input to a low-noise amplifier (LNA) 118 via the exchange switch 115 and the bandpass filter 117. The reception RF signal amplified by the low-noise amplifier 118 is inputs to a down converter 120 via an image removal filter 119.

The first down converter 120 multiplies the reception RF signal with the first local signal of frequency $f_{LO1}$ generated by the local oscillator 112, and frequency-converts (down-converts) the reception RF signal into an IF signal. The IF signal output from the down converter 120 is input to an orthogonal demodulator 125 comprising a divider (not shown) and multipliers 123 and 124 via a bandpass filter 121 and a variable gain amplifier 122.

To the orthogonal demodulator 125 is input the second local signal of orthogonal frequency $f_{LO2}$ from the second local oscillator 106 via the 90° phase shifter (90°-PS) 108, similarly to the orthogonal modulator 105 of the transmitter. The outputs Ich(RX) and Q ch(RX) of the orthogonal demodulator 125 are input to a receiver baseband processor (RX-BB) 126. The received signal is demodulated by receiver baseband processor (RX-BB) 126 to be reproduced to an original data signal.

In the radio transceiver circuit in the mobile radio terminal equipment of such a configuration, the bias generator of the embodiment of the present invention can be applied to the multipliers 102 and 103, the variable gain amplifier 109, the up converter 111, the power amplifier 114, the low-noise amplifier 118, the down converter 120, the variable gain amplifier 122 and multipliers 123 and 124.

As described above, the present invention can provide a mobility proportion current generator outputting a current proportional to mobility. Further, the present invention can provide a bias generator which decreases a temperature dependency of transconductance of a MOS transistor by means of the mobility proportion current generator. Therefore, when this bias generator is used, it is not required to adjust temperature dependency, and a system such as mobile radio terminal equipment which includes an amplifier using a bias generator can be realized at a low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio transceiver apparatus comprising:

a transmitter including a baseband signal generator, an orthogonal modulator fabricated by two multipliers connected to the baseband signal generator, a variable gain amplifier connected to an output of the orthogonal modulator, an up converter connected to an output of the variable amplifier and a power amplifier connected to an output of the up converter, and a receiver fabricated by a low-noise amplifier, a down converter connected to an output of the low-noise amplifier, a variable gain amplifier connected to an output of the down converter and an orthogonal demodulator including multipliers, at least some of the multipliers, the variable gain amplifier, the up converter, the power amplifier, the low-noise amplifier, and the down converter including a bias generator, the bias generator comprising:

a current generator which is configured with a first MOS transistor and a second MOS transistor, and generates a current proportional to mobility of the second MOS transistor; and a current inverter circuit which is supplied with the current and produces the bias current inversely proportional to the mobility, the current generator comprising a voltage adder which includes the first MOS transistor and which adds a voltage, whose temperature dependency is small with respect to the mobility, and a threshold voltage of the first MOS transistor to output a sum voltage, and the second MOS transistor including a source terminal, a gate terminal and a drain terminal, the second MOS transistor receiving the sum voltage between the gate terminal and the source terminal of the second MOS transistor to output the current proportional to the mobility from the drain terminal of the second MOS transistor, and the voltage adder comprising a first current source that outputs a first current whose temperature dependency is small with respect to the mobility, a first resistor producing a voltage whose temperature dependency is small with respect to the mobility when the first current flows through the first resistor, and a second current source which is connected to the first MOS transistor and outputs a second current whose temperature dependency is small with respect to the mobility and which is smaller than the first current, the first MOS transistor generating the sum voltage by adding a gate-source voltage of the first MOS transistor and the voltage produced by the first resistor at the source terminal of the first MOS transistor.

2. The radio transceiver apparatus according to claim 1, wherein the second current source outputs the second current $I_{A2}$ satisfying $\sqrt{(0.5I_{A2}/\mu CoxW/L)}<V_{TH}/10$, where a gate length of the first MOS transistor is L, a gate width is W, mobility is $\mu$, an oxide film capacitance per a unit area is Cox, and a threshold voltage is $V_{TH}$.

3. The radio transceiver apparatus according to claim 1, wherein the voltage adder further comprises a third MOS transistor including a source terminal connected to the first current source, a drain terminal connected to one terminal of the first resistor and a gate terminal connected to a bias potential point, a third current source connected between the source terminal of the third MOS transistor and the constant potential point and outputting a third current identical to the second current.

4. The radio transceiver apparatus according to claim 3, wherein the current inverter circuit comprises a first differential pair of a fourth MOS transistor and a fifth MOS transistor and a second differential pair of a sixth MOS transistor and a seventh MOS transistor, the fourth MOS transistor having a gate terminal and a drain terminal which are connected to each other, source terminals of the fourth MOS transistor and the fifth MOS transistor being connected to a first common source terminal, the current proportional to the mobility which is output from the drain terminal of the second MOS transistor being input to the first common source terminal, a predetermined current whose temperature dependency is small with respect to the mobility being input to the drain terminal of the fourth MOS transistor, and a predetermined supply voltage being applied to a gate terminal of the fifth MOS transistor, source terminals of the sixth MOS transistor and the seventh MOS transistor being connected to a second common source terminal, a predetermined current whose temperature dependency is small with respect to the mobility being input to the second common source terminal, the predetermined supply voltage being applied to a gate terminal of the sixth MOS transistor, a gate terminal of the seventh MOS transistor being connected to the gate terminal of the fourth MOS transistor, and the bias current being output from the drain terminal of the seventh MOS transistor.

5. The radio transceiver apparatus according to claim 4, wherein the fourth MOS transistor, the fifth MOS transistor, the sixth MOS transistor and the seventh MOS transistor operate in a weak inversion domain.

6. The radio transceiver apparatus according to claim 1, wherein the transmitter includes a filter to remove unnecessary harmonics components.

7. The radio transceiver apparatus according to claim 1, wherein the transmitter includes a filter to remove an unnecessary image signal.

8. The radio transceiver apparatus according to claim 1, wherein the receiver includes a filter to remove unnecessary harmonics components.

9. The radio transceiver apparatus according to claim 1, wherein the receiver includes a filter to remove an unnecessary image signal.

10. The radio transceiver apparatus according to claim 1, which includes a common local oscillator to supply a local signal to the up converter and the down converter.

* * * * *